Dec. 7, 1937.   E. C. WALTER   2,101,766
CALCULATING MACHINE
Filed Dec. 17, 1935
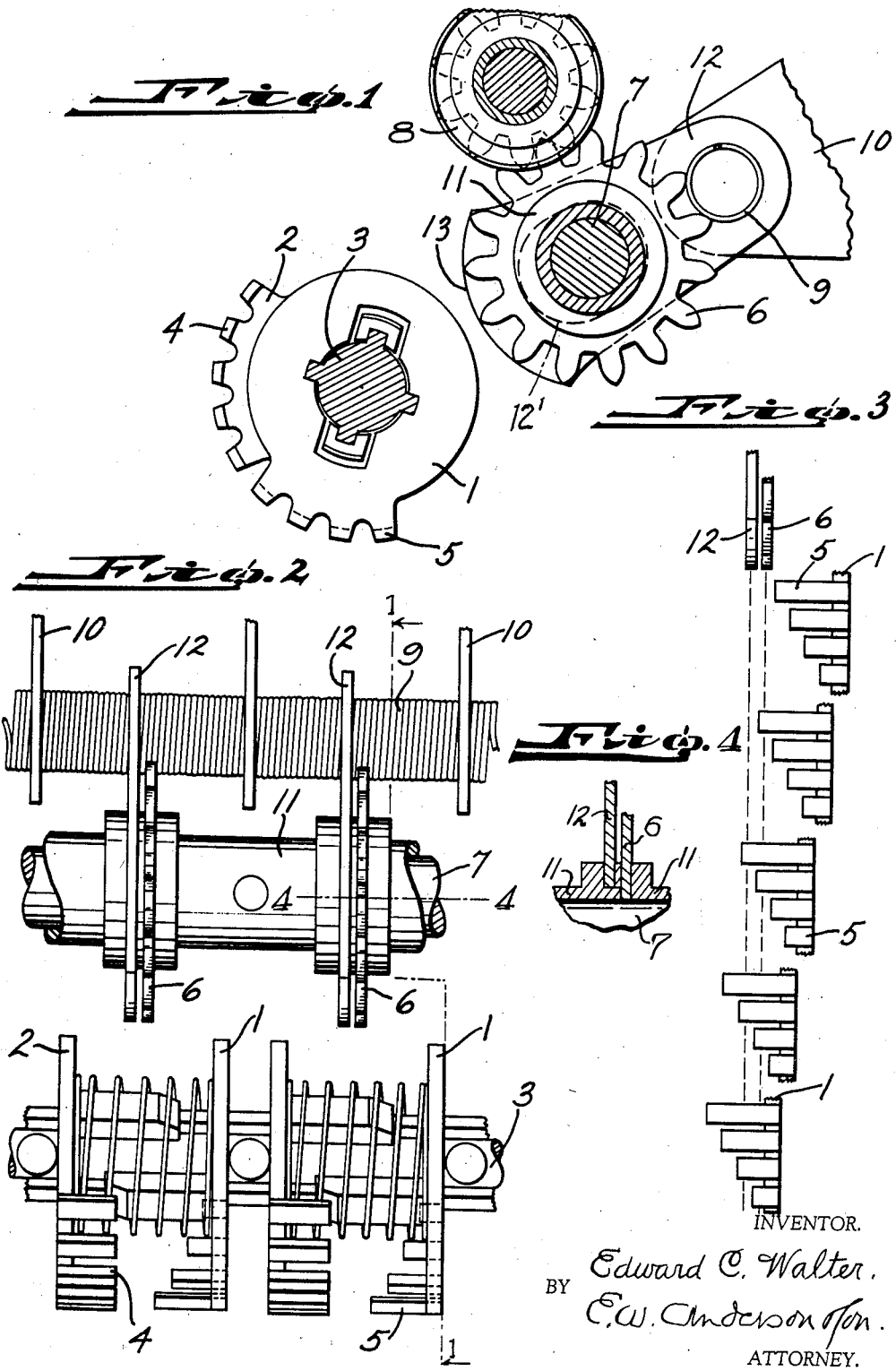
INVENTOR.
Edward C. Walter.
BY E. W. Anderson Jon.
ATTORNEY.

Patented Dec. 7, 1937

2,101,766

UNITED STATES PATENT OFFICE 2,101,766

CALCULATING MACHINE

Edward C. Walter, Orange, N. J., assignor to Monroe Calculating Machine Company, Orange, N. J., a corporation of Delaware Application December 17, 1935, Serial No. 54,909

2 Claims. (Cl. 235—79)

The invention relates to calculating machines, provided with over-rotation check means, such for instance as disclosed in the patent to Edgar E. Phinney, No. 1,349,628, issued August 17, 1920.

An object of the invention is to provide the machine with means for rendering the over-rotation check means ineffective during digitation, thereby reducing friction and resulting in more quiet and smoother as well as speedier operation of the machine.

The invention consists in the novel construction and combinations of parts as set forth in the appended claims.

In the accompanying drawing,

Fig. 1 is a section on the line 1—1, Figure 2.

Fig. 2 is a fragmentary plan view of a portion of the machine showing the invention, parts being broken away.

Fig. 3 is a diagrammatic showing of the various active positions of a four tooth differential actuator or gear segment relative to an intermediate gear and a slide plate.

Fig. 4 is a detail section on the line 4—4, Figure 2.

For each column of the machine, actuating mechanism is provided including two gear segments 1 and 2, slidably mounted upon a drive shaft 3 and rotatable with said shaft; a gear 6 loosely mounted upon a shaft 7 and a numeral wheel gear 8 engaged by the gear 6. The gears 6 therefore constitute gearing connections or intermediate gears between the differential actuators 1 and 2 and the numeral wheel gears.

The gear segments 2 have each five laterally extending teeth 4 of uniform length and the gear segments 1 have each four laterally extending teeth 5, of graded length opposed to the teeth of the gear 2, said gear segments and the gear 6 of any column cooperating in well known manner to impart from one to nine steps of movement to the related numeral wheel gear.

As described in said patent, in order to prevent over-rotation of the numeral wheel gear or gears upon completion of the digitation phase of a cycle of operation, a check spring 9 having spaced supports 10 has engagement with the teeth of the gears 6 to impart a braking action to said gears, and while this provides satisfactory means for the purpose, considerable force is required in the operation of a series of said gears, and since the coils of said spring must snap from tooth to tooth of the gears 6 during digitation, considerable friction and noise results as well as certain slowing up of the operation of the machine.

In the present invention, the following means are provided to render the check spring ineffective during differential movement of the numeral wheel gears in accomplishing digitation.

Mounted upon shoulders of spacing collars 11 secured to the shaft 7 are slidable plates 12, located adjacent to the intermediate gears 6 and provided at their rearward ends with orifices through which the check spring extends, the forward end portions of said slide plates having slots 12' engaged by said shoulders.

During a cycle of operation, the shaft 3 and the gear segments 1 and 2 will make a complete cycle of rotation, and the teeth 4 of the gear segment 2 and the teeth 5 of the gear segment 1 that have been previously set in well-known manner into cooperative relation to the gear 6 will rotate said gear a corresponding number of steps of movement.

The gear element 2 of any column being set in position to cooperate with the related gear 6, all of the five teeth of said gear segment will be in position to cooperate with the related slide plate 12; but the gear segment 1 having been set into position to cooperate with the said gear 6, one less than the total number of teeth of said gear segment will be in position to cooperate with said slide plate, the total number of teeth of said gear segments set into cooperative relation to said slide plate being therefore one less than the full number of steps of digitation.

Thus for example, if the value 8 is to be registered, all of the eight teeth of both gear segments will be opposite the gear 6, but only seven of the said teeth will be opposite the slide plate 12, and during a cycle of operation, seven consecutive teeth of said gear segments will engage the forward arcuate surface 13 of the said slide plate and cam the latter rearwardly to thereby distort and hold the related portion or coils of the spring 9 rearwardly out of engagement with the gear 6 during seven steps of digitation. Said forward arcuate surface 13 of each of the slide plates 12 is concentric with the gear 6.

It is within the spirit of the invention to make all of the teeth 5 of the gear segments 1 cooperative with the slide plates 12 to thereby distort and hold the related portion or coils of the spring 9 rearwardly out of engagement with the gear 6 during the full number of steps of digitation. This however would involve considerably more lateral displacement of the gear 1 and unduly increase the column spacing, whereas the structure as described provides for a minimum of movement of the gear segment 1 and narrow column spacing.

I claim:

1. In a machine of the character described, provided with numeral wheel gears, means for actuating said gears differentially in accomplishing digitation including differential gears and gearing connections between said differential gears and said numeral wheel gears, means for adjusting said differential gears to bring selective teeth thereof into active registering position, and means for checking over-rotation of said numeral wheel gears including a coiled spring parallel to and engaging said gearing connections and having spaced supports; means lying within the paths of movement of the adjusted and without the paths of movement of unadjusted differential gears and cooperating with the active teeth of said differential gears acting as cams for rendering said check spring ineffective during said differential movement of the numeral wheel gears.

2. In a machine of the character described, provided with numeral wheel gears, means for actuating said gears differentially in accomplishing digitation including differential gears and gearing connections between said differential gears and said numeral wheel gears, means for adjusting said differential gears to bring selective teeth thereof into active registering position, and means for checking over-rotation of said numeral wheel gears including a coiled spring parallel to and engaging said gearing connections and having spaced supports; means lying within the paths of movement of the adjusted and without the paths of movement of unadjusted differential gears for rendering said over-rotation check spring ineffective during said differential movement of the numeral wheel gears including spaced slides engaging said spring and provided at their forward ends with arcuate faces concentric with said gearing connections and located in the paths of rotation of the active teeth of said differential gears acting as cams.

EDWARD C. WALTER.